UNITED STATES PATENT OFFICE.

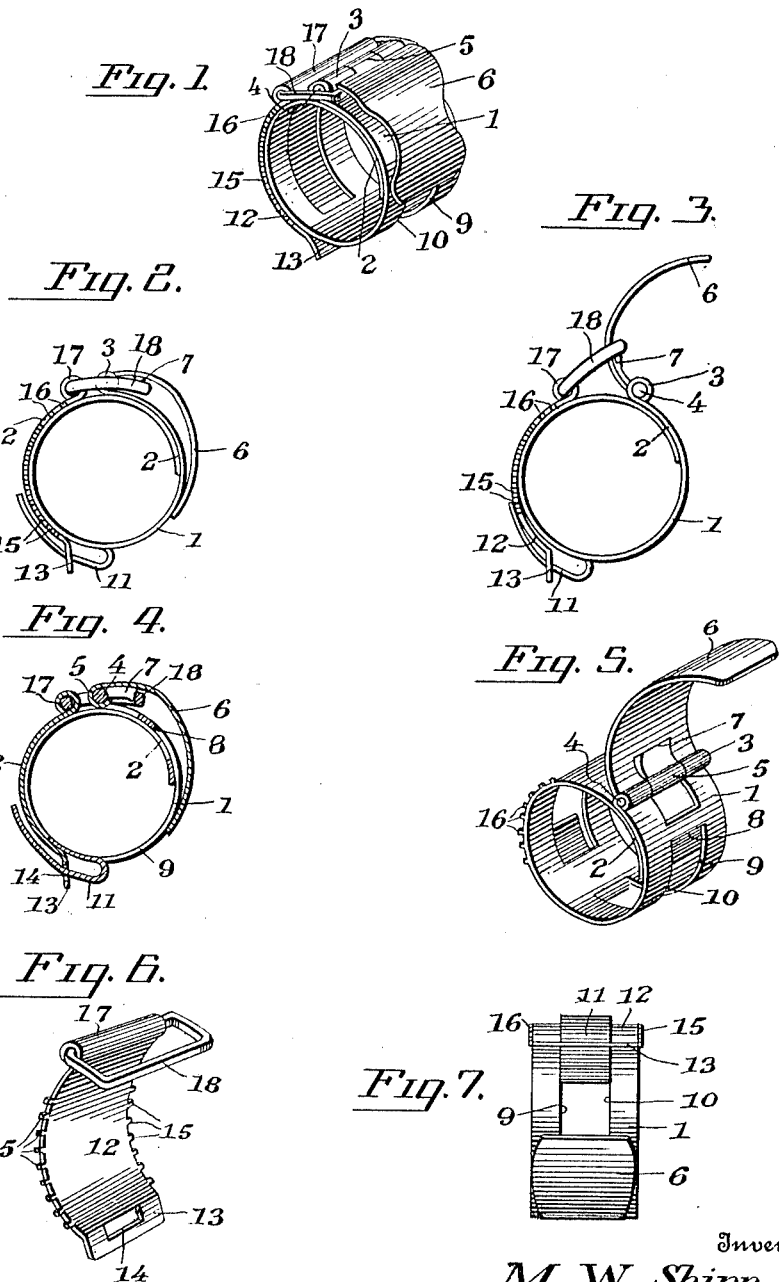

MICHAEL W. SHIPP, OF WILKES-BARRE, PENNSYLVANIA, ASSIGNOR OF TWO-THIRDS TO JACOB SCHMITT AND HARRY MURPHY, OF WILKES-BARRE, PENNSYLVANIA.

HOSE-CLAMP.

1,073,533.   Specification of Letters Patent.   Patented Sept. 16, 1913.

Application filed July 13, 1912. Serial No. 709,152.

*To all whom it may concern:*

Be it known that I, MICHAEL W. SHIPP, a citizen of the United States, residing at Wilkes-Barre, in the county of Luzerne and State of Pennsylvania, have invented new and useful Improvements in Hose-Clamps, of which the following is a specification.

This invention relates to hose clamps, the object in view being to provide a simple device of the class referred to which is adjustable to accommodate fittings and hose sections of different sizes, so that a hose of any size may be quickly and easily clamped to a fitting of any character, the adjustment of the device as a whole to different sizes being quickly effected.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a perspective view of the clamping device complete. Fig. 2 is an edge view thereof in closed position. Fig. 3 is a similar view thereof in open position. Fig. 4 is a longitudinal section through the hose clamp. Fig. 5 is a perspective view of the main section of the clamp. Fig. 6 is a similar view of the adjustable section thereof. Fig. 7 is a face view of the device, showing the interlocking teeth, spring tongue, and clamping lever.

The hose clamp contemplated in this invention comprises a circular spring band 1, the end portions of which overlap to a considerable extent, as shown at 2, the outside overlapping end of the band being provided with a knuckle 3 to receive a hinge pin 4 which passes through the knuckle 5 of a clamping lever 6 which is curved longitudinally, so as to conform, as far as possible, to the outside circumference of the clamping band, when in its applied position. This clamping lever is provided upon its inner side and close to the knuckle of the hinge with a link engaging shoulder 7 which acts to draw the link around the band and tighten the band upon the hose with which it is associated.

At one side, the clamping band 1 is cut along the lines 8, 9 and 10 to form a spring tongue 11, which is bent back or recurved to overlie the outer face of the band for the purpose of engaging the link holding member 12, and pressing the same firmly but yieldingly against the outer surface of the clamping band.

The link holding member 12 is in the form of a plate curved to fit closely against the outer surface of the clamping band, and one extremity of said plate is deflected outward, as shown at 13, and provided with a slot 14, through which the spring tongue above referred to passes, so as to exert an inward pressure against the link holding member and hold the same in yielding contact with the outer surface of the clamping band. The link holding member is provided along its opposite edges with outwardly projecting teeth 15, while the clamping band is also provided with radially projecting teeth 16 adapted to interlock with the teeth 15. This permits the link holding member to be adjusted circumferentially of and around the clamping band, while the teeth are afterward sustained in interlocking relation to each other by means of the spring tongue, which presses the link holding member inward. At its opposite ends, the link holding member is provided with an eye 17 to receive pivotally an open center connecting link 18, through which the clamping lever above described passes.

From the foregoing description, taken in connection with the accompanying drawings, it will now be understood that by rocking the clamping lever, the latter is caused to operate on the link to draw the latter in a direction circumferentially of the clamping band, thereby tightening the clamping band around the hose and securely clamping the hose upon the particular fitting in connection with which it is used. A reverse movement of the clamping lever relieves the link, allowing the same to move backward and releasing the pressure on the clamping band.

In order to adjust the device as a whole to hoses of different sizes, it is only necessary to press the link holding member outward, so as to disengage the interlocking teeth referred to, whereupon said link holding member may be adjusted in either direction around the clamping band, the spring tongue serving to maintain the interlocking teeth in engagement with each other.

What is claimed is:

1. A hose clamp comprising a flexible clamping band having the end portions thereof overlapped, a clamping lever pivotally connected to one end of said band, an open center link through which said lever passes, a flexible link holding strap having said link pivotally connected thereto, interlocking teeth on said band and strap permitting the strap to be adjusted circumferentially of the band, and a spring tongue formed by cutting the band in substantially parallel lines and transversely between said lines and bending the portion separated by such cuts outwardly so as to lie outside of the band and exert an inward pressure on the link holding member.

2. A hose clamp comprising a flexible clamping band having the end portions thereof overlapped, a clamping lever pivotally connected to one end of said band, an open center link through which said lever passes, a flexible link holding strap having said link pivotally connected thereto, interlocking teeth on said band and strap permitting the strap to be adjusted circumferentially of the band, and a spring tongue formed by cutting the band in substantially parallel lines and transversely between said lines and bending the portion separated by such cuts outwardly so as to lie outside of the band and exert an inward pressure on the link holding member, the link holding strap being formed with a slot through which said spring tongue extends.

3. A hose clamp comprising a flexible clamping band having the end portions thereof overlapped, a clamping lever pivotally connected to one end of said band, an open center link through which said lever passes, a flexible link holding strap having said link pivotally connected thereto, interlocking teeth on said band and strap permitting the strap to be adjusted circumferentially of the band, the link holding strap being formed with a slot, and a spring tongue on the band passing through said slot and serving to press the stop yieldingly against the band.

In testimony whereof I affix my signature in presence of two witnesses.

MICHAEL W. SHIPP.

Witnesses:
STERLING O. MILLER,
E. RAY DUTTON.